US009299283B2

(12) United States Patent
Chun et al.

(10) Patent No.: US 9,299,283 B2
(45) Date of Patent: Mar. 29, 2016

(54) APPARATUS FOR COMPENSATING COLOR CHARACTERISTICS IN DISPLAY DEVICE AND COMPENSATING METHOD THEREOF

(71) Applicant: Samsung Display Co., Ltd., Yongin, Gyeonggi-Do (KR)

(72) Inventors: Byung-Ki Chun, Yongin (KR); Yong-Seok Choi, Yongin (KR); Joo-Hyung Lee, Yongin (KR); Jong-Woong Park, Yongin (KR); Dong-Wook Yang, Yongin (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 113 days.

(21) Appl. No.: 14/157,794

(22) Filed: Jan. 17, 2014

(65) Prior Publication Data

US 2014/0306979 A1 Oct. 16, 2014

(30) Foreign Application Priority Data

Apr. 10, 2013 (KR) ........................ 10-2013-0039376

(51) Int. Cl.

| | |
|---|---|
| ***G09G 5/00*** | (2006.01) |
| ***G09G 5/02*** | (2006.01) |
| ***G09G 3/20*** | (2006.01) |
| ***G06T 3/40*** | (2006.01) |
| ***G06T 5/00*** | (2006.01) |
| ***G06T 5/40*** | (2006.01) |
| ***H04N 1/60*** | (2006.01) |

(Continued)

(52) U.S. Cl.

CPC ................ *G09G 3/2003* (2013.01); *G09G 3/12* (2013.01); *G09G 3/3208* (2013.01); *G09G 2320/0242* (2013.01); *G09G 2320/0666* (2013.01); *G09G 2320/0693* (2013.01)

(58) Field of Classification Search

USPC ............. 345/590, 600, 616, 549, 690, 48, 63, 345/77, 89; 348/177, 180, 254, 607, 630, 348/671, 687, 708; 358/518–519, 525; 382/167, 274

See application file for complete search history.

(56) References Cited

U.S. PATENT DOCUMENTS 4,962,418 A * 10/1990 Kamaga ........................ 348/658
7,515,120 B2 4/2009 Choi (Continued)

FOREIGN PATENT DOCUMENTS

KR 10-2005-0075216 A 7/2005
KR 10-2006-0114131 A 11/2006

(Continued)

*Primary Examiner* — Wesner Sajous
(74) *Attorney, Agent, or Firm* — Robert E. Bushnell, Esq.

(57) ABSTRACT

An apparatus and method for compensating color characteristics in individual display devices that each include a display unit including a plurality of pixels to display images according to compensated image data signals, a test data input section to transmit a predetermined test image data signal to the pixels to display a test image, a luminance measuring unit to receive luminance information from the display unit displaying the test image and determine actual luminance ratios of a first color, a second color, and a third color from the received luminance information, a compensation ratio determiner to calculate a compensation ratio from both the actual and reference luminance ratios of each color and a data compensator to generate the compensated image data signals by adjusting external input video signals according to the compensation ratio.

19 Claims, 4 Drawing Sheets

(51) Int. Cl.

| | |
|---|---|
| ***H04N 17/04*** | (2006.01) |
| ***H04N 5/21*** | (2006.01) |
| ***H04N 9/64*** | (2006.01) |
| ***H04N 5/57*** | (2006.01) |
| ***G09G 3/12*** | (2006.01) |
| ***G09G 3/32*** | (2006.01) |

(56) References Cited

U.S. PATENT DOCUMENTS

| | | | | |
|---|---|---|---|---|
| 8,378,933 | B2 | 2/2013 | Kwak et al. | |
| 2007/0052735 | A1 * | 3/2007 | Chou | 345/690 |
| 2008/0068324 | A1 * | 3/2008 | Chung et al. | 345/98 |
| 2011/0234644 | A1 * | 9/2011 | Park et al. | 345/690 |
| 2013/0271502 | A1 | 10/2013 | Choi et al. | |

FOREIGN PATENT DOCUMENTS

| | | | |
|---|---|---|---|
| KR | 10-2007-0031189 | A | 3/2007 |
| KR | 10-2010-0098860 | A | 9/2010 |
| KR | 10-2013-0117061 | A | 10/2013 |

* cited by examiner

APPARATUS FOR COMPENSATING COLOR CHARACTERISTICS IN DISPLAY DEVICE AND COMPENSATING METHOD THEREOF

CLAIM OF PRIORITY

This application makes reference to, incorporates into this specification the entire contents of, and claims all benefits accruing under 35 U.S.C. §119 from an application earlier filed in the Korean Intellectual Property Office filed on Apr. 10, 2013 and there duly assigned Serial No. 10-2013-0039376.

BACKGROUND OF THE INVENTION

1. Field of the Invention

The described technology relates generally to an apparatus for compensating color characteristics in a display device displaying an image and a compensating method thereof.

2. Description of the Related Art

An organic light emitting diode (OLED) is an emissive device which emits light of a phosphor material by the recombination of electrons and holes. Since an organic light emitting diode (OLED) display using the OLED has fast response speed and a low DC driving voltage, and is thin as compared to passive light emitting elements such as a liquid crystal display (LCD) that requires a separate light source, the OLED display is suitable for use as a wall-mountable display or a portable display.

The OLED is classified into a passive matrix organic light emitting diode (PMOLED) and an active matrix organic light emitting diode (AMOLED) using a TFT in accordance with the methods of driving an OLED emission cell. In the passive matrix organic light emitting diode (PMOLED), an anode and a cathode are formed to be perpendicular to each other, and the PMOLED is driven by selecting a line. In addition, in the active matrix organic light emitting diode (AMOLED), a TFT and a capacitor are connected to each ITO pixel electrode, and the AMOLED is driven to maintain a voltage due to capacitance of the capacitor.

In recent years, as a display panel has become enlarged and slimmed, the organic light emitting diode (OLED) display configured to have a large area is required. In the light emitting display panel having a large area, as a load is increased, a driving current is not sufficiently supplied to all of the pixels, so that a load effect occurs due to the luminance difference.

The above information disclosed in this Background section is only for enhancement of understanding of the background of the described technology and therefore it may contain information that does not form prior art under 35 U.S.C. §119 both before and after the America Invents Act.

SUMMARY OF THE INVENTION

An exemplary embodiment provides an apparatus for compensating color characteristics in a display device and a compensating method thereof having advantages of exactly achieving color compensation suitable for a characteristic of each display panel by differentially applying an algorithm for compensating a color error due to a load effect according to a plurality of display panels.

An exemplary embodiment provides an apparatus for compensating color characteristics in a display device and a compensating method thereof which enables an algorithm remapping data by color compensation to represent an effect by recognizing influences due to a load effect changed according to display panels and applying a compensation ratio suitable of each panel According to one aspect of the present invention, there is provided a display device that includes a display unit including a plurality of pixels to display images according to compensated image data signals, a test data input section connected to a display unit to transmit a predetermined test image data signal to the pixels of the display unit to display a test image, a luminance measuring unit configured to receive luminance information from the display unit displaying the test image according to the test image data signal, and determine actual luminance ratios of a first color, a second color, and a third color from the received luminance information, a compensation ratio determiner configured to calculate a compensation ratio for compensating color errors of the first color, the second color, and the third color using the actual luminance ratios of the first color, the second color, and the third color and a data compensator configured to generate the compensated image data signals by adjusting external input video signals according to the compensation ratio and to transmit the compensated image data signals to the display panel.

The display device may also include a reference luminance memory configured to store reference luminance information that includes a sum of reference luminance ratios according to grayscale data signals of the first color, the second color, and the third color, and to transmit the reference luminance information of the first color, the second color, and the third color to the compensation ratio determiner. The display device may also include a luminance calculator configured to sum the actual luminance ratios according of the first color, the second color, and the third color and to transmit the sum of the luminance ratios to the compensation ratio determiner. The compensation ratio determiner may determine the compensation ratio by determining a difference between a sum of the actual luminance ratios of the first color, the second color, and the third color and the sum of reference luminance ratios of the first color, the second color, and the third color. The compensation ratio determiner may instead determine the compensation ratio by determining a difference by colors between actual luminance ratios of the first color, the second color, and the third color and reference luminance ratios according to grayscale data of the first color, the second color, and the third color, respectively. The luminance information may include luminance, color temperature, and color coordinate information corresponding to the first color, the second color, and the third color extracted from the test image.

According to another aspect of the present invention, there is provided display device that includes a display unit including a plurality of pixels to display images according to compensated image data signals, a test data input section connected to a display unit to transmit a predetermined test image data signal to the display unit to display a test image, a driving current measuring unit configured to receive driving current amounts by colors from the pixels of the display unit when display unit displays the test image, a calculator configured to calculate actual luminance ratios of a first color, a second color, and a third color from the driving current amounts, and determine a sum of the actual luminance ratios, a compensation ratio determiner configured to calculate a compensation ratio to compensate for color errors of the first color, the second color, and the third color from either the actual luminance ratios or the sum of the actual luminance ratios and a data compensator configured to generate the compensated image data signals by adjusting external input video signals according to the compensation ratio and to transmit the compensated image data signals to the display panel.

The display device may also include a reference luminance memory configured to store a reference driving current corresponding to grayscale data signals of the first color, the second color and the third color, efficiency of luminance to currents by colors, reference luminance information including reference luminance ratios by colors and a sum of the reference luminance ratios by colors according to reference calculation results of the reference driving current and the efficiency of luminance to driving currents by colors, and to transmit the reference luminance information corresponding to grayscale data signals of the first color, the second color, and the third color to the compensation ratio determiner. The compensation ratio determiner may determine the compensation ratio by determining a difference between the sum of the actual luminance ratios of the first color, the second color, and the third color acquired from the calculator and a sum of reference luminance ratios according to grayscale data of the first color, the second color, and the third color. The compensation ratio determiner may instead determine the compensation ratio by determining a difference between the actual luminance ratios of the first color, the second color, and the third color and the reference luminance ratios according to grayscale data of the first color, the second color, and the third color, respectively.

According to yet another aspect of the present invention, there is a method of compensating color characteristics in a display device, including providing a display unit including a plurality of pixels to display images according to compensated image data signals, transmitting a predetermined test image data signal to the pixels of the display unit, receiving actual luminance information from the display unit displaying a test image according to the test image data signal, determining actual luminance ratios of a first color, a second color, and a third color from the actual luminance information, calculating a compensation ratio to compensate for color errors of the first color, the second color, and the third color from the actual luminance ratios of the first color, the second color, and the third color, generating the compensated image data signals by compensating external input video signals using the compensation ratio and transmitting the compensated image data signals to the pixels of the display unit.

The calculating of the compensation ratio may include determining a difference between a sum of the actual luminance ratios of the first color, the second color, and the third color and a sum of reference luminance ratios according to grayscale data of the first color, the second color, and the third color. The calculating of the compensation ratio may instead determining differences by colors between the actual luminance ratios of the first color, the second color, and the third color and reference luminance ratios according to grayscale data of the first color, the second color, and the third color, respectively. The method may also include storing reference luminance information prior to the calculating of the compensation ratio, the reference luminance information may include a sum of reference luminance ratios according to grayscale data of the first color, the second color, and the third color, and reference luminance ratios with respect to the first color, the second color, and the third color. The determining of the actual luminance ratios may include receiving driving current amounts by colors of the pixels of the display unit upon displaying the test image and calculating the actual luminance ratios of the first color, the second color, and the third color from the received driving current amounts.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
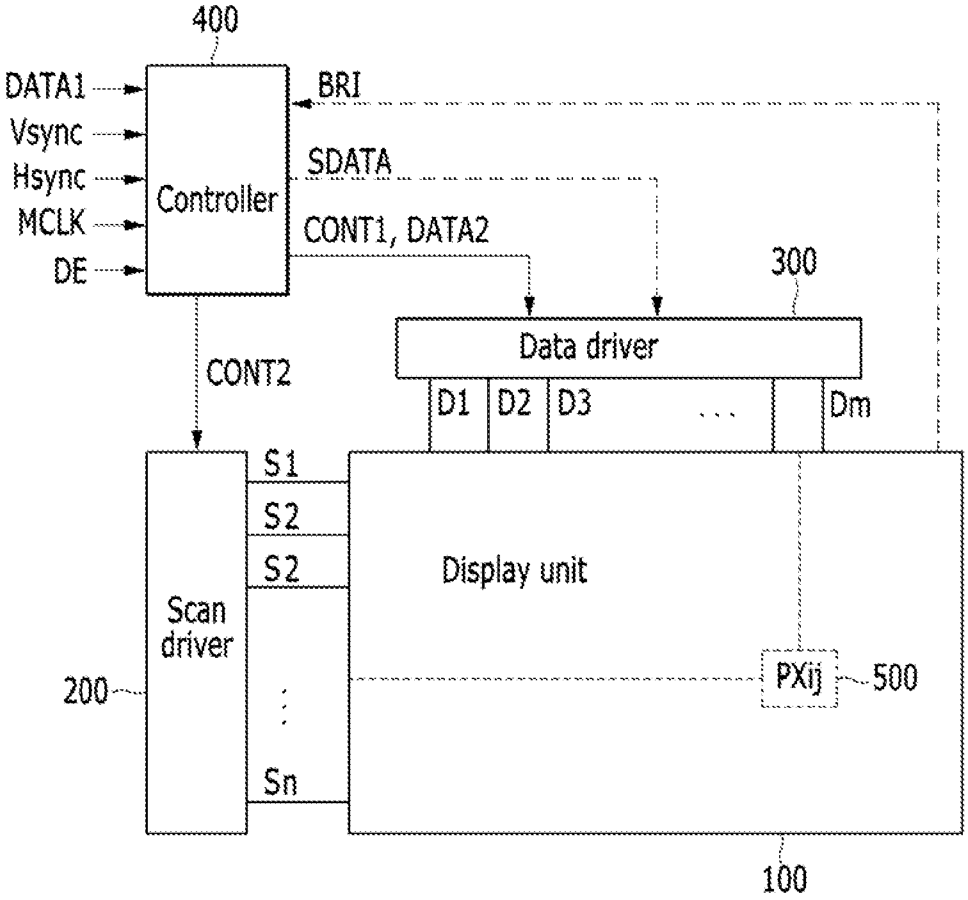
FIG. 1 is a block diagram illustrating a schematic configuration of a display device according an exemplary embodiment.

In the following detailed description, only certain exemplary embodiments have been shown and described, simply by way of illustration. As those skilled in the art would realize, the described embodiments may be modified in various different ways, all without departing from the spirit or scope.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Accordingly, a color error occurs due to the load effect, so that there is a need to develop a color remapping algorithm. The Inventors have found that there have been many attempts to develop an algorithm for compensating for the load effect of the display panel, but a same compensation ratio for the load effect for all display panels in a production environment is limited in that different panels are in need of differing color compensation. That is, since a degree in which a color error is caused varies from panel to panel, if the same compensation algorithm is applied to all the panels, exact compensation is not achieved.

Therefore, the Inventors have found that there is a demand for a compensation algorithm of a color error due to a load effect during a manufacturing procedure of the display so that the compensation algorithm can be adapted and exactly applicable to distinguished characteristics of an individual display panel.

Turning now to FIG. 1, FIG. 1 is a block diagram illustrating a schematic configuration of a display device according an exemplary embodiment. Referring now to FIG. 1, the display device includes a display unit 100 having a plurality of pixels 500, a scan driver 200, a data driver 300, and a controller 400.

The pixels 500 included in the display unit 100 are connected to a plurality of scan lines S1 to Sn and a plurality of data lines D1 to Dm to be arranged in approximately a matrix pattern. The plurality of scan lines S1 to Sn extend in approximately a row direction and are arranged almost in parallel.

The plurality of data lines D1 to Dm extend in approximately a column direction and are arranged almost in parallel. Each of the plurality of pixels 500 in the display unit 100 also receives a power source voltage from an external power supply for driving OLED light emitting elements within the pixels.

The scan driver 200 is connected to the display unit 100 through the plurality of scan lines S1 to Sn. The scan driver 200 generates a plurality of scan signals capable of activating the respective pixels 500 of the display unit 100 according to a scan control signal CONT2, and transmits the generated scan signals to corresponding scan lines among the plurality of scan lines S1 to Sn.

The scan control signal CONT2 is an operation control signal of the scan driver 200 generated and transmitted by the controller 400. The scan control signal CONT2 may include a scan start signal and a clock signal. The scan start signal is a signal to generate a first scan signal for displaying an image of one frame. The clock signal is a synchronization signal for sequentially applying a scan signal to the plurality of scan lines S1 to Sn.

The data driver 300 is connected to the respective pixels 500 of the display unit 100 through the plurality of data lines D1 to Dm. The data driver 300 receives an image data signal DATA2 and transmits the image data signal DATA2 to a corresponding data line among the plurality of data lines D1 to Dm according to a data control signal CONT1. In this case, the image data signal DATA2 is color compensated data that compensates for any color coordinate error due to a load effect corresponding to the video signal DATA1 input from an external image source. Hereinafter, the image data signal DATA2 may be expressed as a color compensated data signal.

Further, the data driver 300 according to an exemplary embodiment may receive a test image data signal SDATA from the controller 400 before transmitting color compensated data signal DATA2 to each pixel 500. Test image data signal SDATA is used to determine what color compensation is needed for each pixel, and the results of the test image are used to convert video signal DATA1 into color compensated data signal DATA2. That is, since an influence due to the load effect varies from panel to panel, in order to acquire luminance information BRI for enhancing the load effect on a corresponding panel, a predetermined test image data signal SDATA is transmitted to the corresponding panel, a test image is displayed, and the luminance is measured and then compared to a reference luminance to determine what correction is needed for the display.

Accordingly, each pixel displays a test image according to the test image data signal SDATA, extracts luminance information BRI according to red (R), green (G), blue (B), and white (W) data from the test image so that the controller 400 can process color compensation to produce color compensated data signal DATA2 and transmit the color compensated data signal DATA2 to the data driver 300.

Meanwhile, the data control signal CONT1 is an operation control signal of the data driver 300 generated and transmitted by the controller 400. The data control signal CONT1 may include not only an operation control signal processing the color compensated data signal DATA2 according to an image signal input from the external image source in the data driver 300, but also an operation control signal capable of controlling an operation processing the test image data signal SDATA for collecting luminance according to each color data for color compensation of the display unit.

The data driver 300 selects a gray voltage according to the color compensated data signal DATA2 which is processed and finally output by the controller 400, and transmits the selected gray voltage to the plurality of data lines D1 to Dm.

The controller 400 receives a video signal DATA1 input from an external source and an input control signal for controlling display of the video signal DATA1. The video signal DATA1 includes luminance information by colors of respective pixels 500 of the display panel 100, and the luminance includes a predetermined number, for example, $1024=2^{10}$, $256=2^8$ or $64=2^6$ grayscales. The video signal DATA1 enables the apparatus for compensating color characteristics included in the controller 400 to determine a color compensation ratio according to a color compensation algorithm, and to perform a color compensation procedure corresponding to luminance data by colors. Thus, the apparatus for compensating a color generates and transmits the color compensated data signal DATA2 to the data driver 300. The color compensation procedure by the controller 400 will be described in detail with reference to the following drawings For example, the input control signal to be transmitted to the controller 400 includes a vertical synchronization signal Vsync, a horizontal synchronization signal Hsync, a master clock MCLK, and a data enable signal DE. The input control signal is not related to a technical characteristic, but may be described by a generally known driving technology in the art and a detailed description thereof is omitted.

Meanwhile, the controller 400 transmits the scan control signal CONT2 for controlling an operation of the scan driver 200 to the scan driver 200. The controller 400 also generates the data control signal CONT1 for controlling an operation of the data driver 300.

Figure 2:
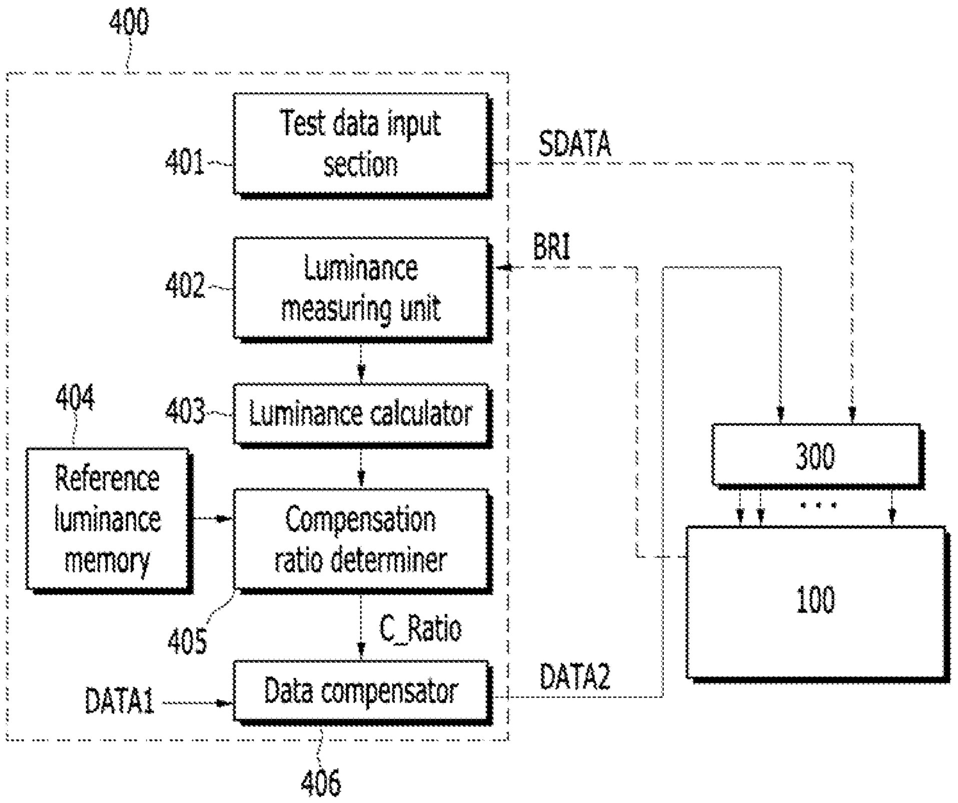
FIG. 2 is a block diagram schematically illustrating a configuration of an apparatus for compensating color characteristics included in a controller of the display device of FIG. 1 according to a first exemplary embodiment.

Turning now to FIG. 2, FIG. 2 is a block diagram schematically illustrating a configuration of an apparatus for compensating a color of the display device of FIG. 1 according to a first exemplary embodiment. The apparatus for compensating a color according to the first embodiment of FIG. 2 includes a test data input section 401, a luminance measuring unit 402, a luminance calculator 403, a reference luminance memory 404, a compensation ratio determiner 405, and a data compensator 406.

As shown in FIG. 2, each configuration of the apparatus for compensating color characteristics may be included in the controller 400, but the present invention is not limited thereto. That is, each configuration of the apparatus for compensating color characteristics may be configured as a driving circuit separately from the controller 400.

Figure 4:
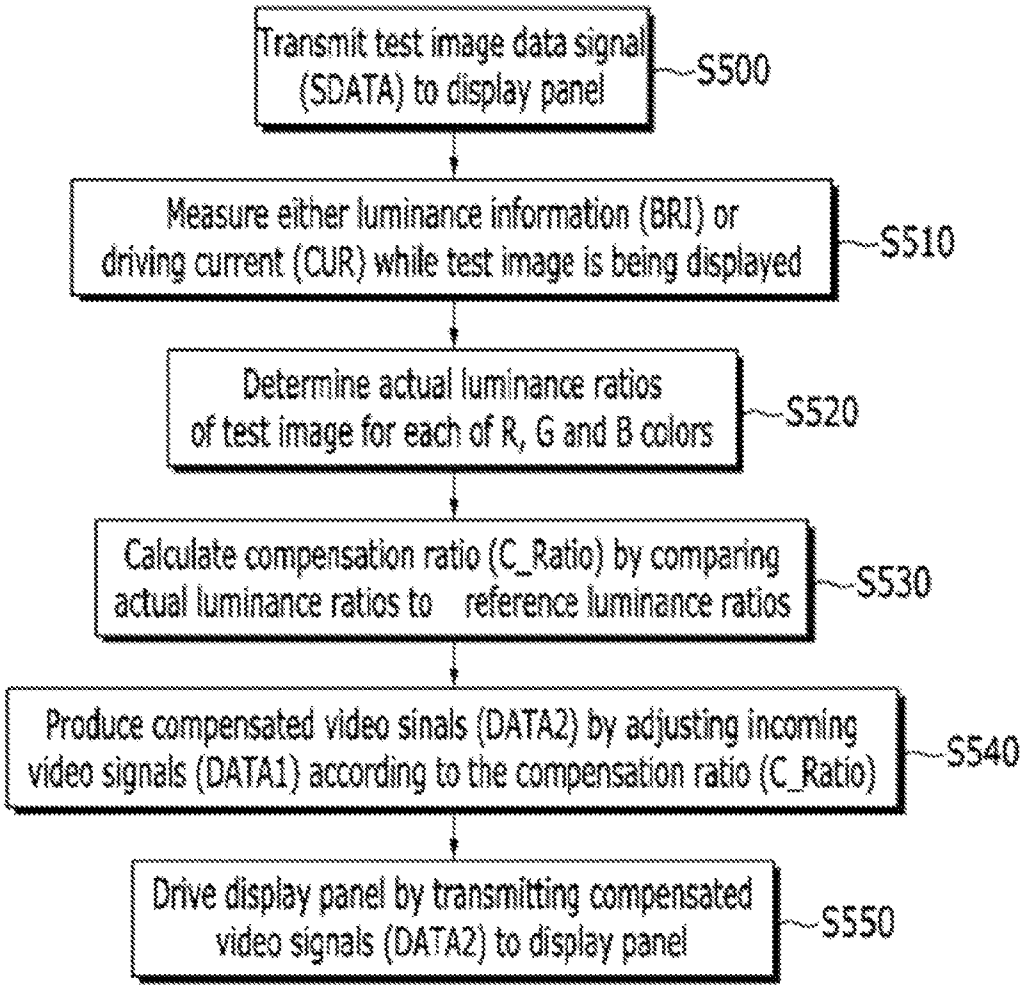
FIG. 4 illustrates a flow chart describing a method of compensating color characteristics of a display panel according to the principles of the present invention.

The test data input section 401 transmits a predetermined test image data signal SDATA to the data driver 300 (see FIG. 4, S500). The test image data signal SDATA includes red (R), green (G), and blue (B) color data signals in order to compensate color coordinate errors by colors. The display unit 100 receives a data voltage according to the test image data signal SDATA, so that each pixel emits light to display a test image. In this case, a test data input section 401 may receive a video signal DATA1 from an external image source to configure the test image data signal SDATA as a part of the video signal DATA1. The test data input section 401 may generate and transmit a predetermined test image data signal SDATA for the purpose of determining color compensation.

The generation and transmission of the test image data signal SDATA may be designed to be performed regularly in order to maintain a predetermined compensation interval, or may be changed according to setting of a user with respect to the display device.

The luminance measuring unit 402 receives luminance information BRI from a test image being displayed on the display unit 100 (see FIG. 4, S510). For example, a camera can be used to measure the test image, but the present invention is in no way limited thereto, as other technologies can be used to measure the test image. In this case, the luminance information BRI may include luminance information, color temperature information, and color coordinate information according to a test image data signal of each pixel including R, G, and B organic light emitting diodes OLEDs, or a white light emitting diode WOLED.

For example, the test image data signal SDATA may include data having 8 bits transmitted to R, G, and B pixels, and may include 255 grayscale data representing maximum luminance in a 256 grayscale range, however the present invention is not limited as a lower grayscale can instead be used. Accordingly, the luminance measuring unit 402 may receive luminance ratios with respect to respective colors (RGB) as the luminance information BRI from the display unit 100 which receives 255 grayscale data of the image data signal SDATA. That is, the luminance measuring unit 402 may acquire light emitting luminance ratios of red, green and blue according to 255 grayscale data of the test image data signal SDATA as red luminance, green luminance, and blue luminance corresponding to R, G, and B color data signals. The light emitting luminance ratio is a percentage % of display luminance of respective R, G, and B colors with respect to the test image entire luminance of the display unit 100.

However, the reference luminance memory 404 may store luminance information about reference luminance (i.e., reference luminance ratio) with respect to grayscale data of each color of the test image data signal SDATA. That is, so as to the reference luminance ratio of each color grayscale data corresponding to the test image data signal SDATA from the test data input section 401, the reference luminance memory 404 previously stores an RGB reference luminance ratio corresponding to each grayscale data in a predetermined grayscale range as an offset value. In the reference luminance, a sum of luminance ratios according to grayscale data is 100% which is a white reference luminance ratio.

The luminance calculator 403 sums luminance ratios of respective color data from luminance information BRI of the test image acquired from the luminance measuring unit 402 (see FIG. 4, S520). According to the first embodiment, the acquired luminance information BRI after the display unit 100 displays the test image when the test image data signal SDATA is transmitted as maximum grayscale data by colors in a 256 grayscale range, includes luminance ratio information by colors (RGB). The luminance calculator 403 sums the test image (or actual) luminance ratios by colors and transmits the sum result value to the compensation ratio determiner 405. Preferably, the sum of reference (or theoretical) luminance ratios by colors is 100%, that is, which must be equal to luminance of maximum grayscale data of a white color. However, due to a load effect occurring in the display unit 100 having a large area, luminance deviation can occur, so that the sum of actual luminance ratios actually exceeds 100%.

The compensation ratio determiner 405 calculates a compensation ratio for compensating a color error due to a load effect using information about a sum of actual luminance ratios by colors calculated by the luminance calculator 403 (see FIG. 4, S530). In detail, the compensation ratio determiner 405 compares a sum of actual luminance ratios by colors acquired from the actual test image (hereinafter referred to as 'sum of actual luminance ratios) with a sum of reference luminance values (reference luminance ratios) with grayscale data of respective colors stored in the reference luminance memory 404 (hereinafter, sum of reference luminance ratios). Accordingly, since an error due to a load effect occurs corresponding to the difference between the sum of actual luminance ratios and the sum of reference luminance ratios, the difference may be determined as a color compensation ratio C_Ratio.

For example, in the exemplary embodiment where the test image data signal SDATA includes 255 grayscale data of red (R), green (G), and blue (B) colors so that luminance information BRI is acquired from the test image, a reference luminance ratio according to each color of the 255 grayscale data stored in the reference luminance memory 404 may be red reference luminance ratio 21.3%, green reference luminance ratio 71.5%, and blue reference luminance ratio 7.2%. According to the reference luminance ratio of each color data, the white luminance ratio is 100%, which is a sum of reference luminance ratios of each color data when light is preferably emitted corresponding to red, green and blue grayscale data.

However, an actual luminance ratio of color data of the test image data signal SDATA has red luminance ratio 36.8%, green luminance ratio 77.3%, and blue luminance ratio 7.2% acquired from the luminance information BRI. In this case, according to the result calculated by the luminance calculator 403, the sum of actual luminance ratios is 121.3% of each color data. The difference between the sum of the actual luminance ratios and 100% being the sum of the reference luminance ratio is 21.3%.

Since the difference of 21.3% is an error occurring due to a load effect of the display unit 100 of a corresponding display device, the compensation ratio determiner 405 may determine the color compensation ratio C_Ratio to be 21.3%.

Meanwhile, in a case of another exemplary embodiment, the compensation ratio determiner 405 determines a color compensation ratio C_Ratio using another scheme. That is, the compensation ratio determiner 405 compares an actual luminance ratio of each color data with a reference luminance ratio of each color data stored in the reference luminance memory 404 by the same colors, and determines the difference in the luminance ratios by colors with respect thereto as a color compensation ratio with respect to each color.

For example, the color compensation ratio with respect to red data is 15.5%, which is a difference between the actual red luminance ratio 36.8% and the red reference luminance ratio 21.3%. Further, the color compensation ratio with respect to green data is 5.8%, which is a difference between an actual green luminance ratio 77.3% and the green reference luminance ratio 71.5%. However, in the above example, since a color compensation ratio with respect to the blue data has an actual blue luminance ratio of 7.2% and a blue reference luminance ratio of 7.2%, the difference between the actual blue luminance ratio and the blue reference luminance ratio is 0%, so that color compensation of the blue data is not necessary.

Accordingly, the compensation ratio determiner 405 may determine an exact compensation ratio when a color compensation ratio is determined by colors according to each color data luminance ratio as another exemplary embodiment as compared with when the color compensation ratio C_Ratio using a sum of luminance ratios of each color data.

The data compensator 406 receives the color compensation ratio C_Ratio determined by the compensation ratio determiner 405, and modifies input video signal DATA1 by colors (see FIG. 4, S540) according to the color compensation ratio to perform color compensation and produce color the compensated data signal DATA2, which is then transmitted to the data driver 300 (see FIG. 4, S550).

In detail, assuming that a grayscale value of a red data signal in the input video signal DATA1 is 186 Gray, and the color compensation ratio calculated as a sum of luminance ratios and a color compensation ratio calculated by comparing luminance ratios by colors with each other (comparison of red luminance ratios) is 10%, if a grayscale value of the red data signal is expressed as luminance (gamma form), the test image or actual luminance ratio is 50% and the red data signal has a higher luminance ratio due to a luminance error. Accordingly, the red data must be compensated so that the red luminance ratio is 40% by subtracting the color compensation ratio. When the red data signal has a 2.2 gamma curve, in order to change a grayscale value of red data to a value corresponding to a luminance ratio of 40%, if an inverse gamma is applied, an equation of $0.4^{(1/2.2)} \times 255$ is calculated, and a grayscale value of the corrected or compensated red data signal is determined to be 168 gray.

Therefore, the data compensator 406 receives the color compensation ratio and an input video signal in order to calculate a grayscale value of a compensated image data signal by colors. The color compensation ratio is subtracted from the luminance ratio of the input video signal, and compensated grayscales are produced by calculating the compensated luminance ratio by an equation using an inverse gamma, and accordingly a compensation video signal compensated by colors is generated.

Figure 3:
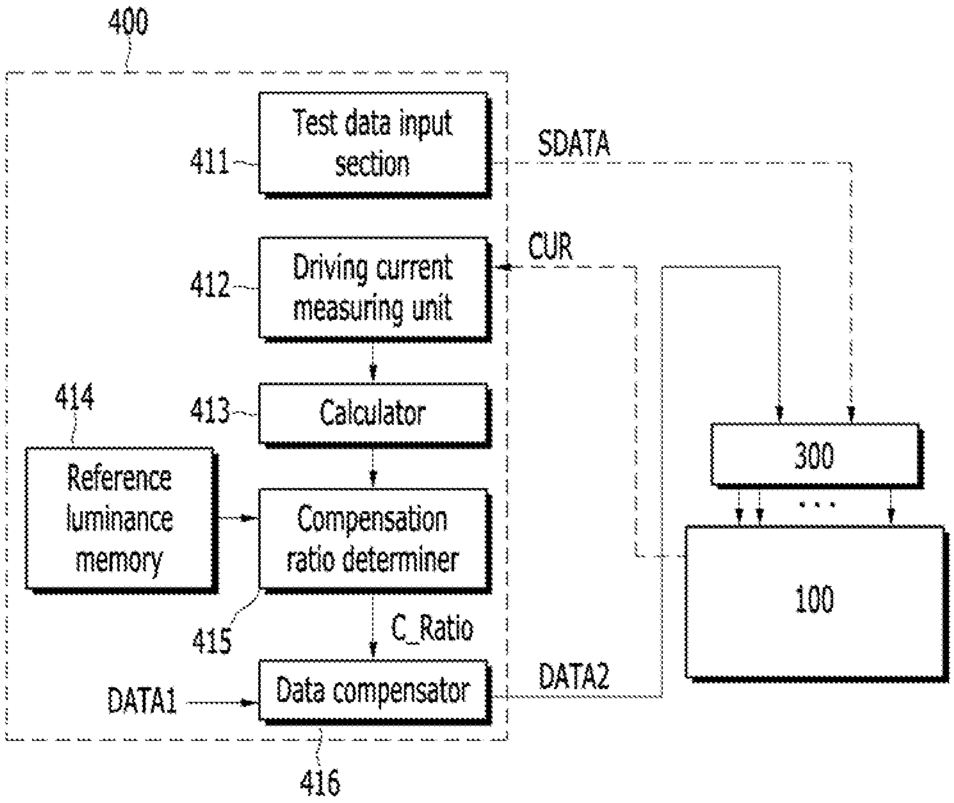
FIG. 3 is a block diagram schematically illustrating a configuration of an apparatus for compensating color characteristics included in a controller of the display device of FIG. 1 according to a second exemplary embodiment.

Turning now to FIG. 3, FIG. 3 is a block diagram schematically illustrating a configuration of an apparatus for compensating color characteristics in the display device of FIG. 1 according to a second exemplary embodiment. The apparatus for compensating color characteristics in the display device according to the second exemplary embodiment of FIG. 3 includes a data input section 411, a reference luminance memory 414, a compensation ratio determiner 415, and a data compensator 416 similar to the first exemplary embodiment of FIG. 2. The apparatus for compensating color characteristics according to the second embodiment of FIG. 3 further includes a driving current measuring unit 412 and a calculator 413.

The apparatus for compensating color characteristics of FIG. 3 has the same configuration as some of the configuration of FIG. 2, but there is a difference in a scheme for determining a color compensation ratio C_Ratio. That is, in the apparatus for compensating color characteristics of FIG. 2, since separate equipment for measuring luminance with respect to a test image of the display unit 100 is required, and it is difficult to mount the equipment for measuring the luminance on the panel of the display device, a separate production process may be added. In contrast, since the apparatus for compensating color characteristics of FIG. 3 determines a color compensation ratio by measuring a driving current in the pixels when a test image is being displayed, the apparatus according to the second embodiment of FIG. 3 includes a driving current measuring unit 412 and a calculator 413.

The test data input section 411 has substantially the same function as that of the test data input section of the apparatus for compensating color characteristics of FIG. 2, and the repetition in the description about the same components will be omitted.

When the test data input section 411 transmits the test image data signal SDATA to the display unit 100 through the data driver 300 (see FIG. 4, S500), the driving current measuring unit 412 measures a driving current CUR according to red (R), green (G), and blue (B) color data from the display unit 100 that is displaying the test image (see FIG. 4, S510). The driving current measurement CUR includes a red driving current R_CUR measured from the plurality of pixels 500 of the display unit 100 emitting light according to red data, a green driving current G_CUR measured from the plurality of pixels of a display unit emitting light according to green data, and a blue driving current B_CUR measured from the plurality of pixels of a display unit emitting light according to blue data.

Since the plurality of pixels 500 included in the display unit 100 of the organic light emitting diode (OLED) display flow the driving current through the OLED to display an image, the driving current is proportional to the luminance. For example, when the test image data signal SDATA transmitted to the test data input section 411 includes 255 grayscale data expressing maximum luminance of red (R), green (G), and blue (B) colors in a 256 grayscale range, the driving current measuring unit 412 measures a driving current, that is, a red driving current R_CUR, a green driving current G_CUR, a blue driving current B_CUR corresponding to 255 grayscale data of each color being displayed on the display unit 100.

The calculator 413 receives the measured driving current CUR and calculates actual luminance (luminance ratio) (see FIG. 4, S520) of respective colors from the driving current of respective colors, and sums the actual luminance ratios of respective colors to calculate a sum of actual luminance ratios. In this case, actual luminance (luminance ratio) of each color may be calculated by multiplying efficiency of luminance to currents by colors corresponding to a driving current of each color, that is, a red luminance ratio (Kr), a green luminance ratio (Kg), and blue luminance ratio (Kb). An operation of calculating a final sum of actual luminance ratios using actual luminance (luminance ratio) of each color by the calculator 413 is the same as that of the exemplary embodiment of FIG. 2.

Meanwhile, a compensation ratio determiner 415 calculates color compensation ratio C_Ratio (see FIG. 4, S530) for compensating a color using a sum of actual luminance ratios of respective colors calculated by the calculator 413.

As in the first embodiment of FIG. 2, reference luminance information with respect to grayscale data of each color stored may be stored in the reference luminance memory 414. The reference luminance memory 414 according to an exemplary embodiment of FIG. 3 may store a reference driving current and efficiency of the luminance to currents by colors, that is, a red luminance ratio Kr, a green luminance ratio Kg, and a blue luminance ratio Kb as the luminance information. Accordingly, the reference luminance memory 414 may store reference luminance ratios of respective colors and a sum of the reference luminance ratios according to calculation results of the reference driving current and the efficiency of luminance to currents by colors as the reference luminance information.

Accordingly, in the same manner as in the first embodiment of the apparatus for compensating color characteristics of FIG. 2, the compensation ratio determiner 415 determines color compensation ratio C_Ratio using a sum of reference luminance ratios stored in the reference luminance memory 414, a sum of reference luminance ratios of respective colors and an actual luminance ratio received from the calculator 413, or using a difference between actual luminance (luminance ratio) of the respective colors.

Further, an operation for generating color compensated data signal DATA2 (see FIG. 4, S540) in which color compensation is processed in order to improve a load effect of each color using the color compensation ratio C_Ratio by the data compensator 416 is similar to that of FIG. 2.

Turning now to FIG. 4, FIG. 4 illustrates a flowchart illustrating a method for compensating for color characteristics in the display device according to the principles of the present invention. It is to be understood that FIG. 4 is a general framework for the method of compensation of the present invention, and that the steps recited in FIG. 4 may be varied and modified as discussed above and still be within the scope of the present invention. For example, in step S520, it is to be understood that it is possible to also calculate a sum of the actual luminance ratios for the red green and blue colors in addition to determining the actual luminance ratios of the red green and blue colors. Is to also be understood that in step S530, the calculation of the compensation ratio by comparing the actual luminance ratios to the reference luminance ratios can also include comparing a sum of the actual luminance ratios to a sum of the reference luminance ratios, and still be within the scope of the present invention.

A detailed description of the accompanying drawings and the invention are only an embodiment, which are used for the purpose of describing the embodiment but are not used to limit the meanings or a range of the embodiment described in claims. Accordingly, those skilled in the art to which the invention pertains can easily select and substitute therefrom. A person of an ordinary skill in the art may omit some of constituent elements described in the specification without degradation of performance or may add constituent elements to improve performance. In addition, a person of an ordinary skill in the art may change an order of steps included in the method according to a process environment or equipment. Therefore, a range of the embodiment must be determined by claims and equivalents not embodiments.

| <DESCRIPTION OF THE SYMBOLS IN THE DRAWINGS> | |
|---|---|
| 100: display unit | 200: scan driver |
| 300: data driver | 400: controller |
| 500: pixel | |
| 401, 411: test data input section | 402: luminance measuring unit |
| 403: luminance calculator | |
| 404, 414: reference luminance memory | |
| 405, 415: compensation ratio determiner | 406, 416: data compensator |
| 402, 412: driving current measuring unit | 403, 413: calculator |

What is claimed is:

1. A display device, comprising:

a display unit including a plurality of pixels to display images according to compensated image data signals;

a test data input section connected to the display unit to transmit a predetermined test image data signal to the pixels of the display unit to display a test image;

a luminance measuring unit configured to receive luminance information from the display unit displaying the test image according to the test image data signal, and determine actual luminance ratios of a first color, a second color, and a third color from the received luminance information;

a compensation ratio determiner configured to calculate a compensation ratio for compensating color errors of the first color, the second color, and the third color using the actual luminance ratios of the first color, the second color, and the third color; and a data compensator configured to generate the compensated image data signals by adjusting external input video signals according to the compensation ratio and to transmit the compensated image data signals to the display panel.

2. The display device of claim 1, further comprising a reference luminance memory configured to store reference luminance information that includes a sum of reference luminance ratios according to grayscale data signals of the first color, the second color, and the third color, and to transmit the reference luminance information of the first color, the second color, and the third color to the compensation ratio determiner.

3. The display device of claim 1, further comprising a luminance calculator configured to sum the actual luminance ratios according of the first color, the second color, and the third color and to transmit the sum of the luminance ratios to the compensation ratio determiner.

4. The display device of claim 2, wherein the compensation ratio determiner determines the compensation ratio by determining a difference between a sum of the actual luminance ratios of the first color, the second color, and the third color and the sum of reference luminance ratios of the first color, the second color, and the third color.

5. The display device of claim 1, wherein the compensation ratio determiner determines the compensation ratio by determining a difference between actual luminance ratios of the first color, the second color, and the third color and reference luminance ratios according to grayscale data of the first color, the second color, and the third color, respectively.

6. The display device of claim 1, wherein the luminance information comprises luminance, color temperature, and color coordinate information corresponding to the first color, the second color, and the third color extracted from the test image.

7. A display device, comprising:

a display unit including a plurality of pixels to display images according to compensated image data signals;

a test data input section connected to the display unit to transmit a predetermined test image data signal to the display unit to display a test image;

a driving current measuring unit configured to receive driving current amounts by colors from the pixels of the display unit when display unit displays the test image;

a calculator configured to calculate actual luminance ratios of a first color, a second color, and a third color from the driving current amounts, and determine a sum of the actual luminance ratios;

a compensation ratio determiner configured to calculate a compensation ratio to compensate for color errors of the first color, the second color, and the third color from either the actual luminance ratios or the sum of the actual luminance ratios; and a data compensator configured to generate the compensated image data signals by adjusting external input video signals according to the compensation ratio and to transmit the compensated image data signals to the display panel.

8. The display device of claim 7, further comprising a reference luminance memory configured to store a reference driving current corresponding to grayscale data signals of the first color, the second color and the third color, efficiency of luminance to currents by colors, reference luminance information including reference luminance ratios by colors and a sum of the reference luminance ratios by colors according to reference calculation results of the reference driving current and the efficiency of luminance to driving currents by colors, and to transmit the reference luminance information corresponding to grayscale data signals of the first color, the second color, and the third color to the compensation ratio determiner.

9. The display device of claim 7, wherein the compensation ratio determiner to determine the compensation ratio by determining a difference between the sum of the actual luminance ratios of the first color, the second color, and the third color acquired from the calculator and a sum of reference luminance ratios according to grayscale data of the first color, the second color, and the third color.

10. The display device of claim 8, wherein the compensation ratio determiner to determine the compensation ratio by determining a difference between the actual luminance ratios of the first color, the second color, and the third color and the reference luminance ratios according to grayscale data of the first color, the second color, and the third color, respectively.

11. A method of compensating color characteristics in a display device, comprising:

providing a display unit including a plurality of pixels to display images according to compensated image data signals;

transmitting a predetermined test image data signal to the pixels of the display unit;

receiving actual luminance information from the display unit displaying a test image according to the test image data signal;

determining actual luminance ratios of a first color, a second color, and a third color from the actual luminance information;

calculating a compensation ratio to compensate for color errors of the first color, the second color, and the third color from the actual luminance ratios of the first color, the second color, and the third color;

venerating the compensated image data signals by compensating external input video signals using the compensation ratio; and transmitting the compensated image data signals to the pixels of the display unit.

12. The method of claim 11, wherein the calculating the compensation ratio comprises determining a difference between a sum of the actual luminance ratios of the first color, the second color, and the third color and a sum of reference luminance ratios according to grayscale data of the first color, the second color, and the third color.

13. The method of claim 11, wherein the calculating of the compensation ratio comprises determining differences by colors between the actual luminance ratios of the first color, the second color, and the third color and reference luminance ratios according to grayscale data of the first color, the second color, and the third color, respectively.

14. The method of claim 11, further comprising storing reference luminance information prior to the calculating of the compensation ratio, the reference luminance information including a sum of reference luminance ratios according to grayscale data of the first color, the second color, and the third color, and reference luminance ratios with respect to the first color, the second color, and the third color.

15. The method of claim 11, wherein the determining of the actual luminance ratios comprises:

receiving driving current amounts by colors of the pixels of the display unit upon displaying the test image; and calculating the actual luminance ratios of the first color, the second color, and the third color from the received driving current amounts.

16. The method of claim 15, wherein the calculating actual luminance ratios comprises multiplying an efficiency of luminance to the measured driving current amounts for each of the first color, the second color and the third color.

17. The method of claim 15, wherein the calculating the compensation ratio comprises determining a difference between a sum of the actual luminance ratios of the first color, the second color, and the third color and a sum of reference luminance ratios according to grayscale data of the first color, the second color, and the third color.

18. The method of claim 15, wherein the calculating of the compensation ratio comprises determining differences by colors between the actual luminance ratios of the first color, the second color, and the third color and reference luminance ratios according to grayscale data of the first color, the second color, and the third color, respectively.

19. The method of claim 15, further comprising storing reference information prior to the calculating of the compensation ratio, the reference information comprises:

reference driving currents corresponding to grayscale data signals of the first color, the second color and the third color;

efficiency of luminance to driving currents by colors; and reference luminance information including reference luminance ratios by colors and a sum of the reference luminance ratios by colors according to reference calculation results of the reference driving currents and the efficiency of luminance to driving currents by colors.

* * * * *